(12) United States Patent
Olivier

(10) Patent No.: US 6,651,517 B1
(45) Date of Patent: Nov. 25, 2003

(54) FUEL DISPENSING SYSTEM

(76) Inventor: Paul D. Olivier, 15555 N. 79th Pl., Scottsdale, AZ (US) 85260

( * ) Notice: Subject to any disclaimer, the term of this patent is extended or adjusted under 35 U.S.C. 154(b) by 0 days.

(21) Appl. No.: 09/924,042

(22) Filed: Aug. 7, 2001

(51) Int. Cl.[7] .................................................. G01F 1/05
(52) U.S. Cl. ........................... 73/861.79; 73/861.84; 73/861.77; 222/23
(58) Field of Search ................. 73/891.79, 861.22, 73/861.77, 861.83, 861.84; 222/23

(56) References Cited

U.S. PATENT DOCUMENTS

| | | | |
|---|---|---|---|
| 3,732,163 A | | 5/1973 | Lapidot |
| 3,855,124 A | | 12/1974 | Lapidot |
| 3,934,473 A | * | 1/1976 | Griffo ........................ 73/861.84 |
| 4,313,824 A | | 2/1982 | Huss et al. |
| 4,313,833 A | | 2/1982 | West |
| 4,809,558 A | * | 3/1989 | Watson et al. ............ 73/861.22 |
| 5,271,851 A | | 12/1993 | Nelson et al. |
| 5,288,391 A | | 2/1994 | Biceroglu |
| 5,509,305 A | * | 4/1996 | Husain et al. ............. 73/861.84 |
| 5,689,071 A | | 11/1997 | Ruffner et al. |
| 5,831,176 A | * | 11/1998 | Morgenthale et al. ... 73/861.77 |
| 5,866,824 A | * | 2/1999 | Schieber ................... 73/861.79 |
| 5,905,183 A | | 5/1999 | White et al. |
| 5,910,234 A | | 6/1999 | Mautner et al. |

OTHER PUBLICATIONS

Chemical Technicians' Ready Reference Handbook, Second Edition, (McGraw–Hill Book Company, NY, NY, copyright 1987) pp. 311–312.

\* cited by examiner

*Primary Examiner*—Harshad Patel
(74) *Attorney, Agent, or Firm*—Frank J. McGue

(57) ABSTRACT

A fuel dispensing system employing a dual rotor turbine flow meter is disclosed.

7 Claims, 8 Drawing Sheets

| FOR $P_1$ | FOR $P_2$ | FOR $P_3$ | FOR $P_{n+1}$ | FOR $P_{n+2}$ |
|---|---|---|---|---|
| $f_{A1} = \dfrac{(P_{A4} - P_{A1}) - 1}{(N_3 \cdot N_{11})/f_{CL}}$ | $f_{A2} = \dfrac{(P_{A7} - P_{A4}) - 1}{(N_5 \cdot N_3)/f_{CL}}$ | $f_{A3} = \dfrac{(P_{A10} - P_{A7}) - 1}{(N_7 \cdot N_5)/f_{CL}}$ | $f_{An+1} = \dfrac{(P_{An+5} - P_{An+2}) - 1}{(N_{n+4} \cdot N_{n+2})/f_{CL}}$ | $f_{An+2} = \dfrac{(P_{An+7} - P_{An+5}) - 1}{(N_{n+5} \cdot N_{n+4})/f_{CL}}$ |
| $f_{B1} = \dfrac{(P_{B3} - P_{B1}) - 1}{(N_4 \cdot N_2)/f_{CL}}$ | $f_{B2} = \dfrac{(P_{B5} - P_{B3}) - 1}{(N_6 \cdot N_4)/f_{CL}}$ | $f_{B3} = \dfrac{(P_{B7} - P_{B5}) - 1}{(N_8 \cdot N_6)/f_{CL}}$ | $f_{Bn+1} = \dfrac{(P_{Bn+2} - P_{Bn}) - 1}{(N_{n+3} \cdot N_{n+1})/f_{CL}}$ | $f_{Bn+2} = \dfrac{(P_{Bn+5} - P_{Bn+2}) - 1}{(N_{n+6} \cdot N_{n+3})/f_{CL}}$ |
| $Ro_{A1} = \dfrac{f_{A1}(1 + 2\alpha(T_1 - T_R))}{v_1}$ | $Ro_{A2} = \dfrac{f_{A2}(1 + 2\alpha(T_2 - T_R))}{v_2}$ | $Ro_{A3} = \dfrac{f_{A3}(1 + 2\alpha(T_3 - T_R))}{v_3}$ | $Ro_{An+1} = \dfrac{f_{An+1}(1 + 2\alpha(T_{n+1} - T_R))}{v_{n+1}}$ | $Ro_{An+2} = \dfrac{f_{An+2}(1 + 2\alpha(T_{n+2} - T_R))}{v_{n+2}}$ |
| $St_{A1}$ = Function ($Ro_{A1}$) | $St_{A2}$ = Function ($Ro_{A2}$) | $St_{A3}$ = Function ($Ro_{A3}$) | $St_{An+1}$ = Function ($Ro_{An+1}$) | $St_{An+2}$ = Function ($Ro_{An+2}$) |
| $Ro_{B1} = \dfrac{f_{B1}(1 + 2\alpha(T_1 - T_R))}{v_1}$ | $Ro_{B2} = \dfrac{f_{B2}(1 + 2\alpha(T_2 - T_R))}{v_2}$ | $Ro_{B3} = \dfrac{f_{B3}(1 + 2\alpha(T_3 - T_R))}{v_3}$ | $Ro_{Bn+1} = \dfrac{f_{Bn+1}(1 + 2\alpha(T_{n+1} - T_R))}{v_{n+1}}$ | $Ro_{Bn+2} = \dfrac{f_{Bn+2}(1 + 2\alpha(T_{n+2} - T_R))}{v_{n+2}}$ |
| $St_{B1}$ = Function ($Ro_{B1}$) | $St_{B2}$ = Function ($Ro_{B2}$) | $St_{B3}$ = Function ($Ro_{B3}$) | $St_{Bn+1}$ = Function ($Ro_{Bn+1}$) | $St_{Bn+2}$ = Function ($Ro_{Bn+2}$) |
| $q_1 = \dfrac{(f_{A1} + f_{B1})}{(St_{A1} + St_{B1}) * (1 + 3\alpha(T_1 - T_R))}$ | $q_2 = \dfrac{(f_{A2} + f_{B2})}{(St_{A2} + St_{B2}) * (1 + 3\alpha(T_2 - T_R))}$ | $q_3 = \dfrac{(f_{A3} + f_{B3})}{(St_{A3} + St_{B3}) * (1 + 3\alpha(T_3 - T_R))}$ | $q_{n+1} = \dfrac{(f_{An+1} + f_{Bn+1})}{(St_{An+1} + St_{Bn+1}) * (1 + 3\alpha(T_{n+1} - T_R))}$ | $q_{n+2} = \dfrac{(f_{An+2} + f_{Bn+2})}{(St_{An+2} + St_{Bn+2}) * (1 + 3\alpha(T_{n+2} - T_R))}$ |
| $Q_1 = q_1(N_4 \cdot N_1)$ | $Q_2 = q_2(N_6 \cdot N_4)$ | $Q_3 = q_3(N_8 \cdot N_6)$ | $Q_{n+1} = q_{n+1}(N_{n+4} \cdot N_{n+1})$ | $Q_{n+2} = q_{n+2}(N_{n+6} \cdot N_{n+4})$ |
| $Q_T = Q_T + Q_0$ | $Q_T = Q_T + Q_2$ | $Q_T = Q_T + Q_3$ | $Q_T = Q_T + Q_{n+1}$ | $Q_T = Q_T + Q_{n+2}$ |

*FIG. 7.*

FUEL DISPENSING SYSTEM

TECHNICAL FIELD

This invention relates generally to the field of fuel dispensing systems, and, more particularly, to an improved fuel dispensing system using a dual rotor turbine flow meter.

BACKGROUND OF THE INVENTION

Fuel dispensing systems used for highway vehicles and marine applications generally contain from one to eight flow meters and associated valves and dispensing hoses. One or more displays indicate the total delivered fuel quantity and the resultant sale price. Dispenser systems also provide one or more pumps to lift the fuel from underground storage tanks for delivery to the vehicle. The pumps are either mounted within the storage tanks or separate therefrom.

Multiple fuel grades, usually differing octane levels for gasoline, are often delivered from one dispenser. Diesel fuel is generally maintained in a separate piping, metering and delivery system.

Meters are typically positive displacement meters which utilize multiple pistons on a crankshaft to measure the volume of fuel passing therethrough. As fuel is forced through the meters, each piston is displaced thereby causing rotation of the crankshaft. Each stroke of the piston displaces a precise quantity of fuel. For each stroke of the piston, a number of electrical pulses is emitted from an encoding device mounted to the end of the piston shaft. The number of pulses is used to calculate the volume which has passed through the meter.

Piston meters as described do have some drawbacks. For example, seals employed in such meters are affected by the various chemical additives in the fuels. Over time and because of new additives blended into gasoline, the seals may deteriorate. Piston meters also tend to be quite large and bulky. Thus, packaging of up to eight meters in a single dispenser creates a very large dispenser.

Further, as ambient conditions such as the air temperature of the temperature of the fuel change, the internal dimensions of the piston meter also changes due to thermal expansion of the materials used to manufacture the meter thereby resulting in errors in the delivered fuel quantities reported. There is no known method for correcting this dimensional problem with piston meters.

While the inherent accuracy of the piston meter has been satisfactory for decades due to the relatively low price of fuel, as the price of gasoline rises, the need for ever improved accuracy increases. The piston meter may not be able to meet this need.

Further, state of the art electronics now afford an opportunity to predict and alarm a central station when a failure of the metering system is impending. However, piston meters do not have this capability.

Thus, there is a need for the use of a fuel dispensing system employing a new type of meter meeting these requirements. The present invention meets these needs.

SUMMARY OF THE INVENTION

It is an object of this invention to provide an improved fuel dispensing system having a meter which provides improved accuracy over piston meters.

It is a farther object of this invention to provide an improved fuel dispensing system which is much smaller than a piston meter with commensurate decline in the volumes of liquid contained therein.

It is still another object of this invention to provide an improved fuel dispensing system which includes the ability to predict impending failures of the metering system.

It is another object of this invention to provide an improved fuel dispensing system which is less sensitive to ambient conditions and which employs no seals to degrade performance over time.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 7 is a diagram showing the calculations used in the timing diagram of FIG. 6.

DESCRIPTION OF THE PREFERRED EMBODIMENT

The present invention is, in its simplest form, the replacement of the piston meters 12 and 42 previously described by a wide range, high accuracy dual rotor flow meters 12 and 42. In the most preferred embodiment, such flow meters 12 and 42 use counter-rotating dual rotors as described fully in U.S. Pat. No. 5,689,071 entitled "Wide Range, High Accuracy Flow Meter" which issued on Nov. 18, 1997 to Ruffner et al. This patent is hereby incorporated by reference.

As described within U.S. Pat. No. 5,689,071, the wide range, high accuracy flow meter is a dual rotor turbine flow meter which is upto 100 times smaller than a corresponding piston meter and approximately 10 times lighter. The dual rotor turbine flow meter is 2–3 times more accurate than a corresponding piston meter while the internal volume of fuel-contained within the dual rotor turbine flow meter is several hundred times less. Further, the dual rotor turbine flow meter has the ability to predict impending failure by the changing ratio of rotor speeds from the norm. The characteristics of the dual rotor turbine flow meter allow the performance of same to compensate for changes in temperature, either ambient or the fuel itself The dual rotor turbine flow meter does not employ elastomeric seals and is therefore impervious to gasoline additives.

Figure 1:
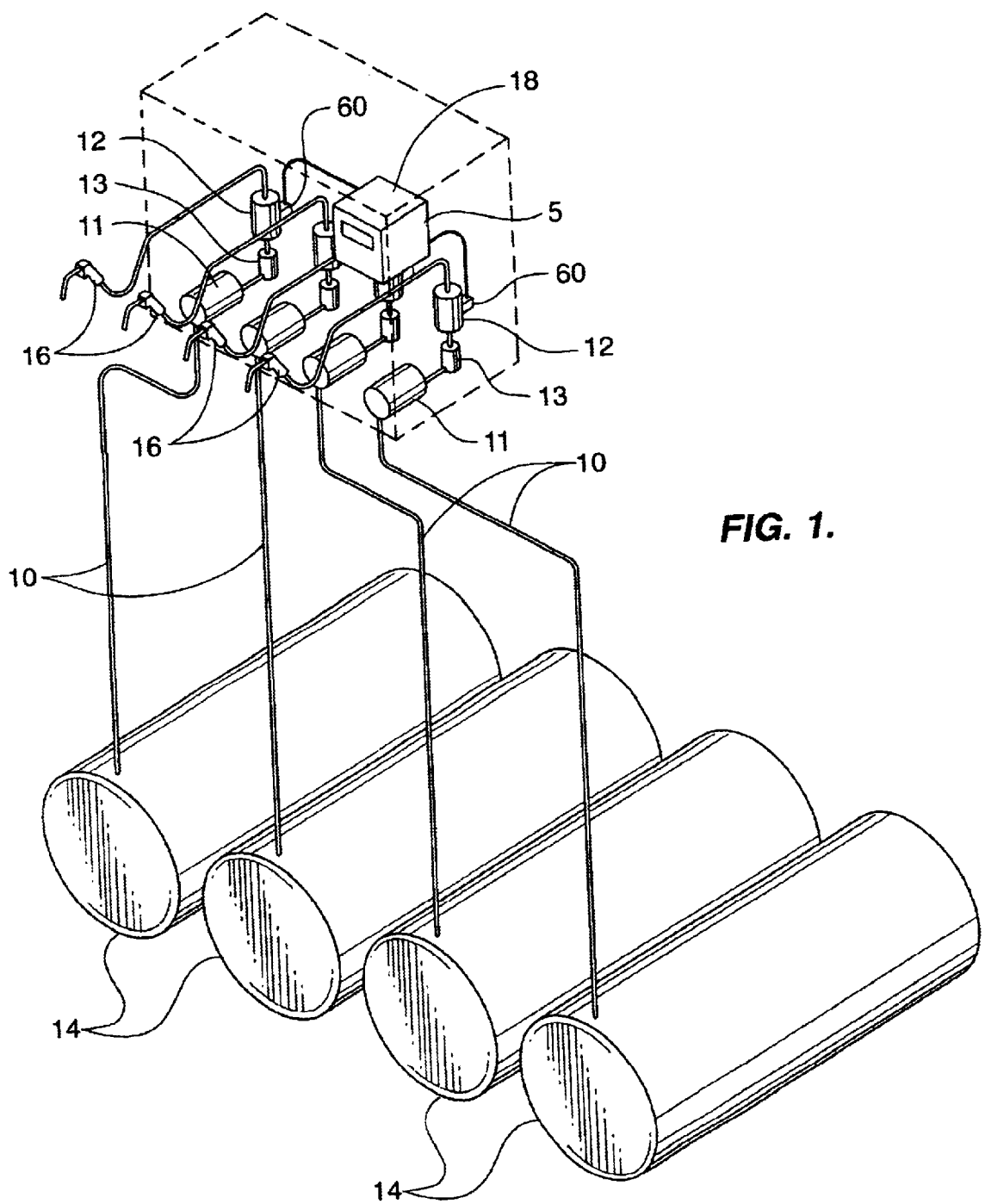
FIG. 1 is schematic view of a fuel dispensing system using individual systems for each separate grade of fuel.

As best seen in FIG. 1, in a system 5 generally limited to those with two or three differing grades of fuel, either with or without diesel, each individual grade is maintained in its own separate piping, metering and delivery system 10. In such a configuration, a separate pump 11, dual rotor turbine flow meter 12 and control valve 13 is used for each, grade which is stored within its own tank 14 and dispensed through a separate dispensing hose 16. No mixing of the various grades takes place.

Since most dispenser systems 10 can be used from either of two sides, the number of systems 10 is usually a multiple of two. Meters 12, valves 13 and pumps 11 are electrically connected to a point of sale display controller 18 which selects the grade and displays the amount of fuel dispensed and the sale price thereof.

Figure 2A:
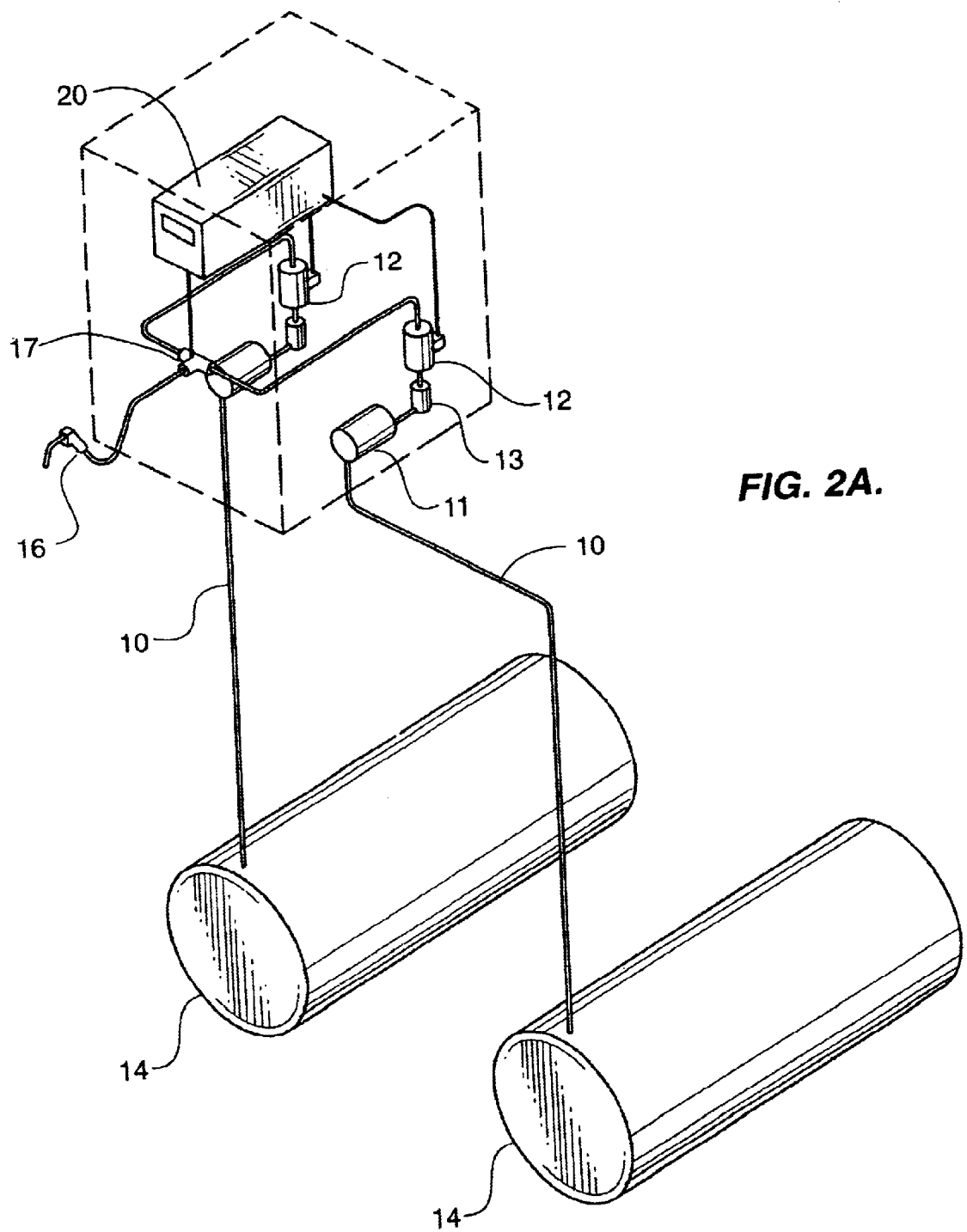
FIGS. 2A and 2B are schematic views of a fuel dispensing system using individual system for each grade of fuel which dispenses the fuel from one hose.
Figure 2B:
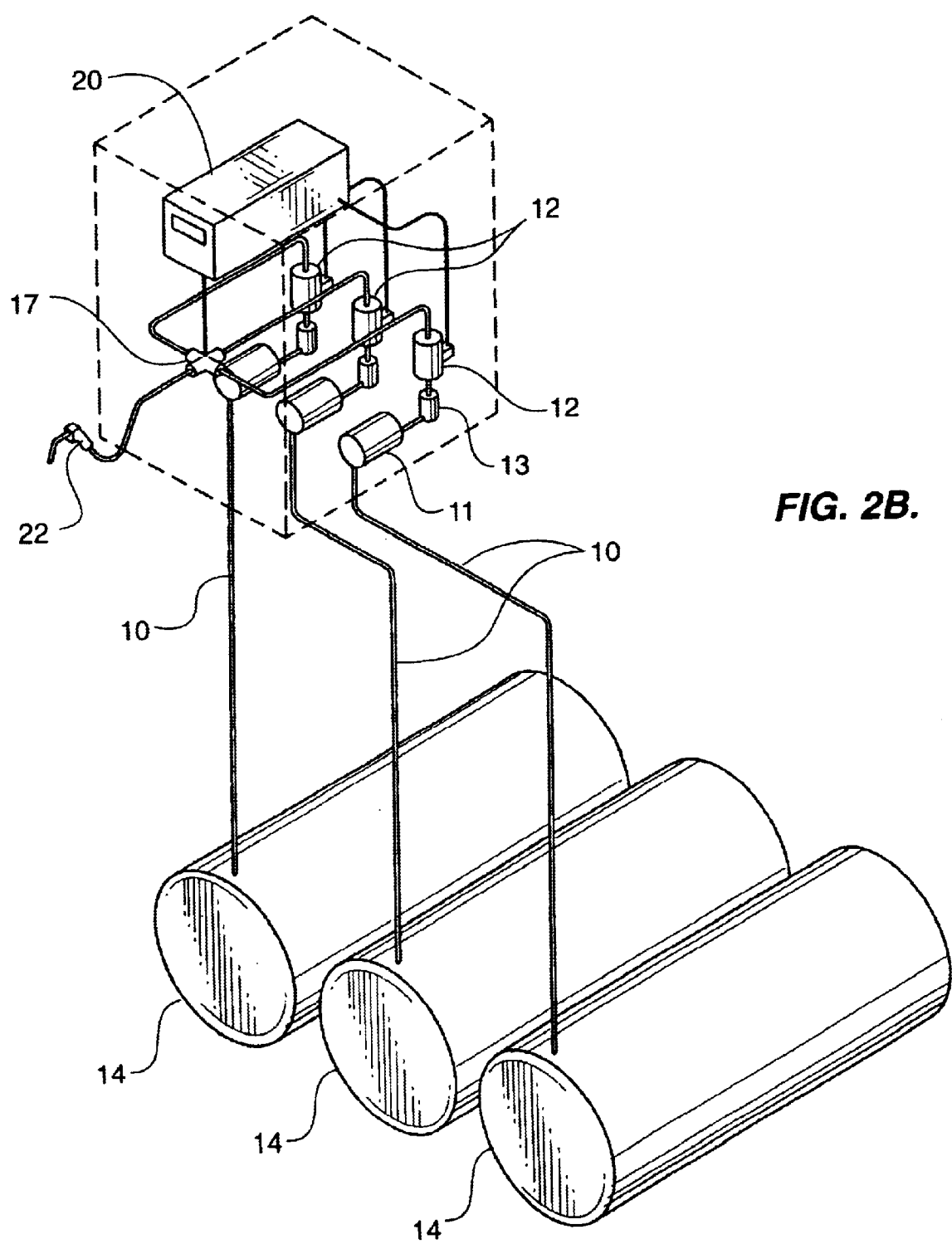

As best seen in FIGS. 2A and 2B, in another system 20 multiple grades of fuel are dispensed through a single hose 22 but maintained separably within its own tank 14, control valve 13 and meter 12. The volume of piping in the hose 22 must be kept below a preset limit usually determined by a regulatory agency whereby the mixing of one grade with another is minimal when switching between grades. A selector valve 17 determines from which tank 14 the fuel is dispensed.

Figure 3:
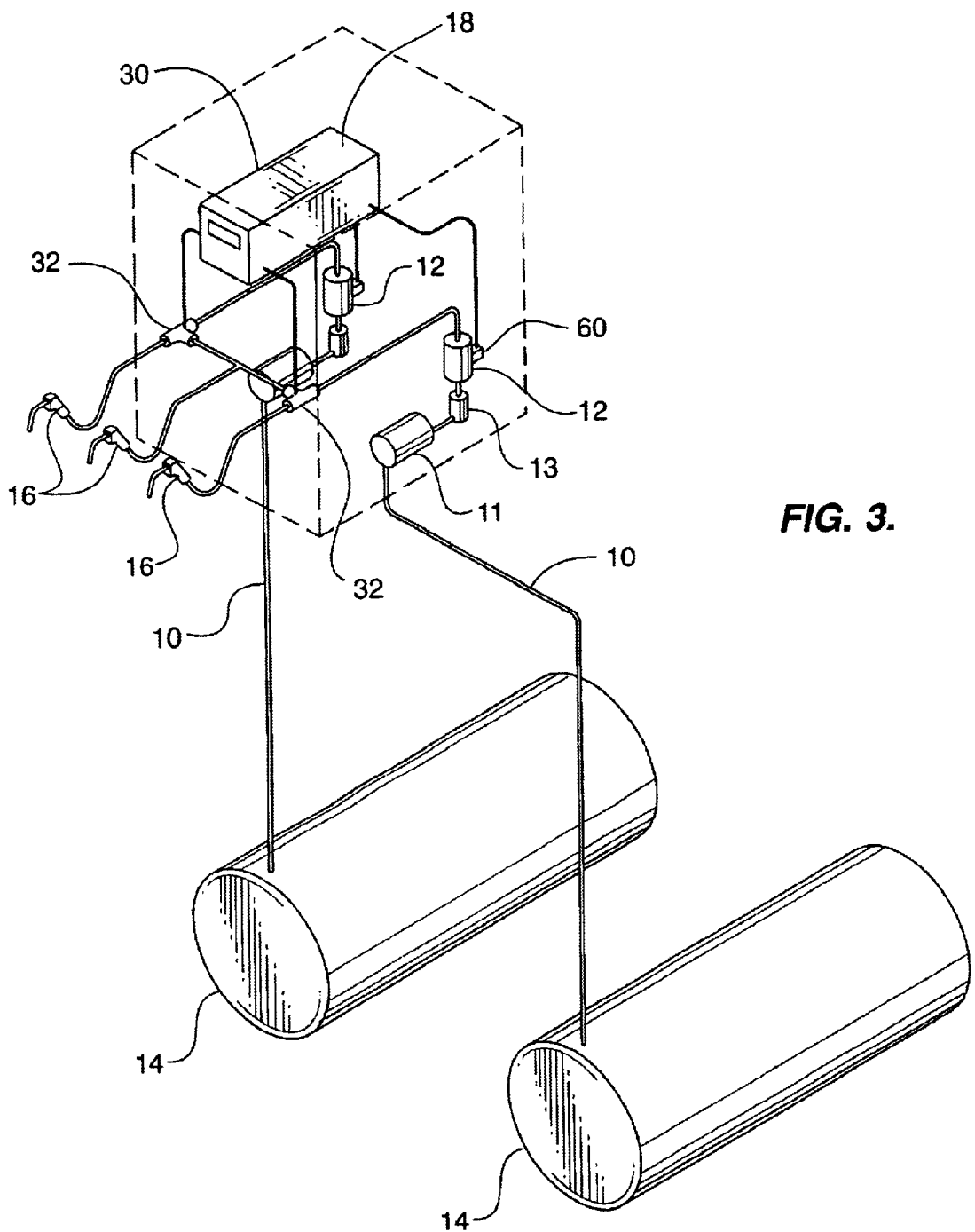
FIG. 3 is a schematic view of a fuel dispensing system which blends two grades of gasoline to create multiple grades of fuel for dispensing via two separate meters for each of the two grades of gasoline.

As best seen in FIG. 3, still another system 30 creates multiple, grades of gasoline by blending two grades within dispensing system 30. The configuration uses individual system 10 comprising pump 11, dual rotor turbine flow meter 12, control valve. 13 and tank 14 for each of the two stored grades of gasoline. A pair of mixing valves 32 regulate the rate of flow from the two tanks 14 to a predetermined ratio to deliver the blended grade selected by the consumer. Meter 12 within each separate system 10 is used to measure the quantity of each grade employed in the particular blended grade and the sum of the two meters 12 is used to compute the actual delivered quantity of fuel at display 18.

Figure 4:
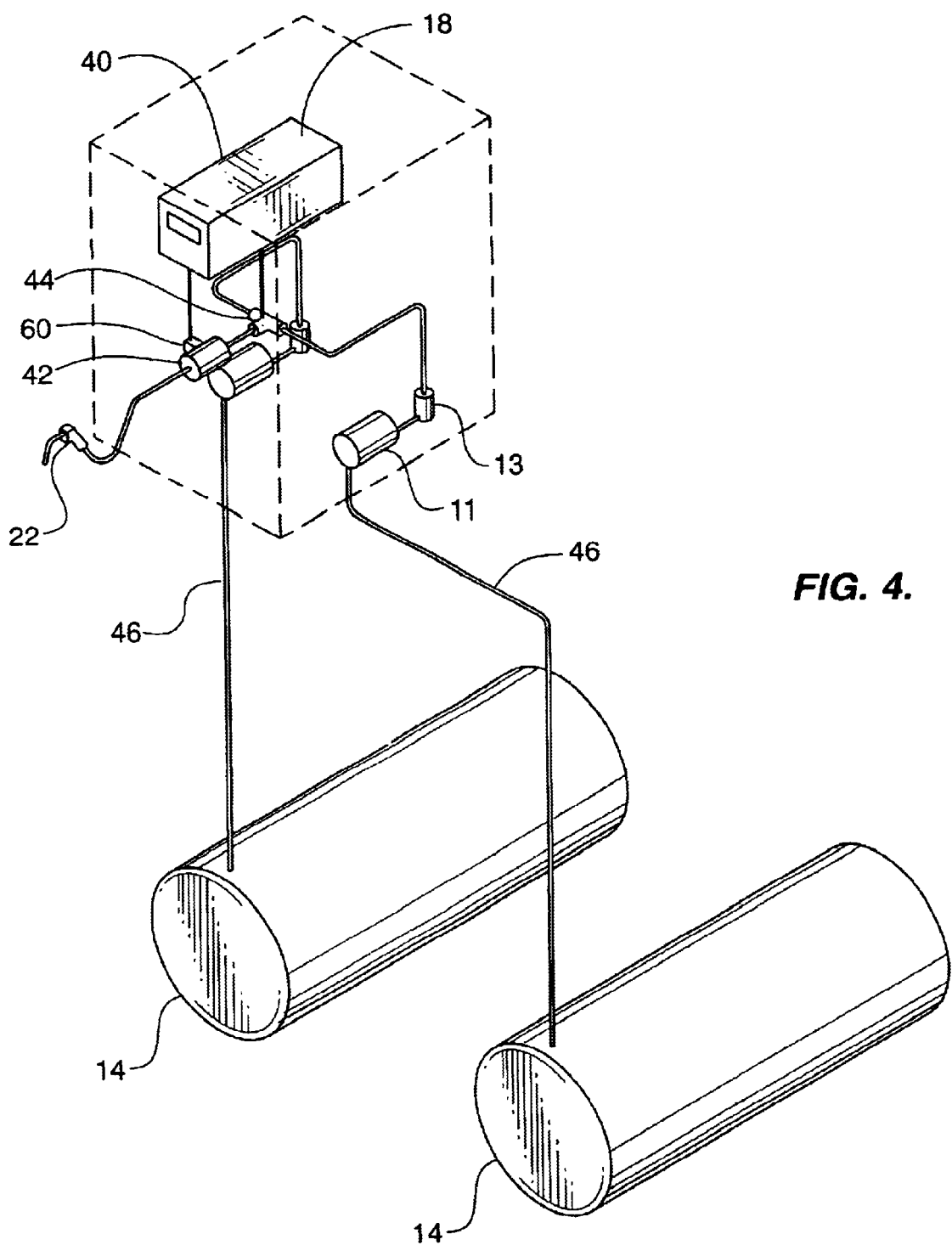
FIG. 4 is a schematic view of a fuel dispensing system which blends two grades of gasoline to create multiple grades of fuel for dispensing via a single meter.

In still a fourth system 40 best seen in FIG. 4, a single dual rotor turbine flow meter 42 is used to measure all dispensed quantities of fuel. The configuration uses two individual systems 46 comprising pump 11, control valve 13 and tank 14 for each of the two stored grades of gasoline. A single selector valve 44 joins the two systems 46 and regulates the rate of flow from either of the two tanks 14. Single meter 42 is used to measure the quantity of delivered fuel to display 18. The volume of piping in system 40 after selector valve 44 must be kept below a preset limit usually determined by a regulatory agency whereby the mixing of one grade with another is minimal when switching between grades.

Figure 5:
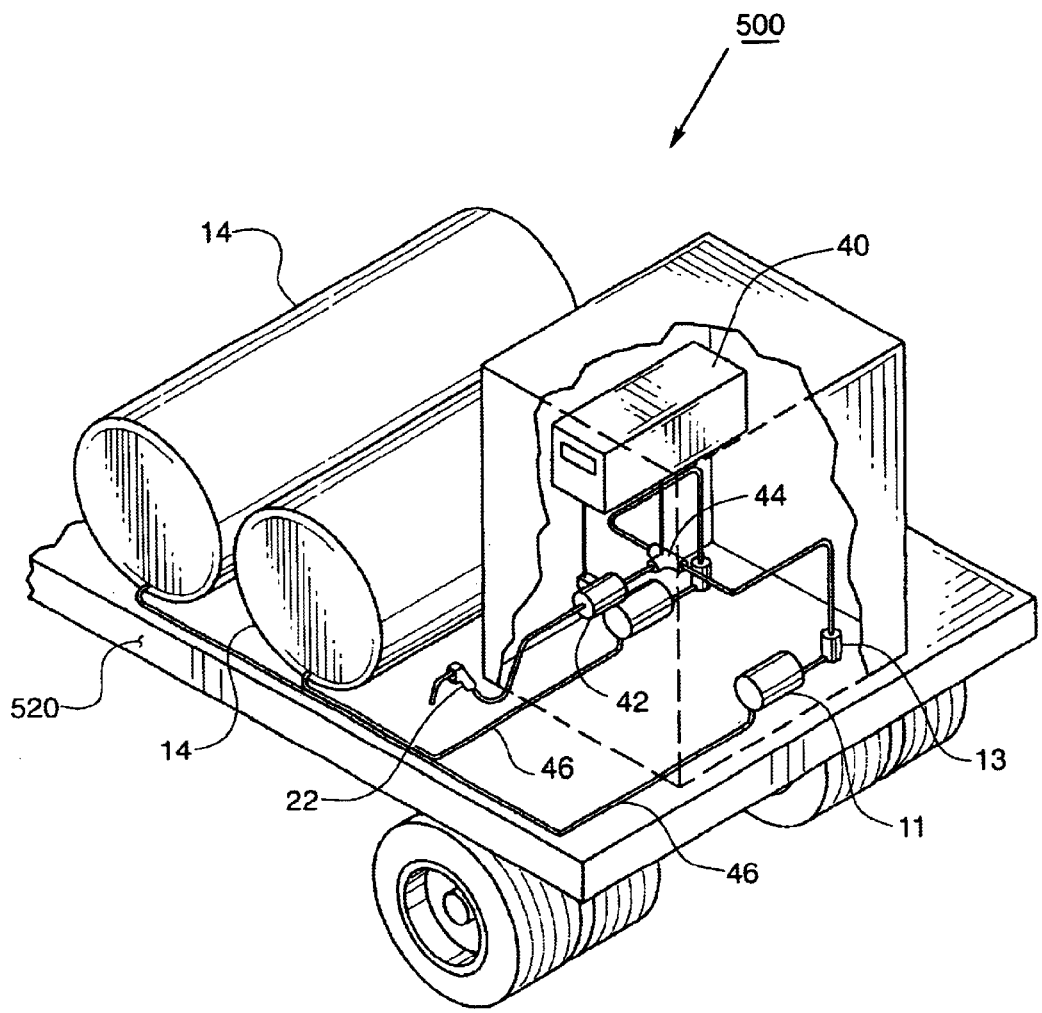
FIG. 5 is a schematic view of a mobile fuel dispensing system.

In still a fifth system 500 shown in FIG. 5, the system previously described in connection with FIG. 4 is mounted on a truck 520 for mobility. System 500 is frequently used to fuel aircraft although it is typical of any mobile dispensing system. Physical replacement of a traditional piston meter 12 or 42 is as simple as removing the piston meter and inserting the dual rotor turbine flow meter therefore. While small changes in the plumbing may be necessary, such changes are well known in the art. If the system is designed from scratch, rather than a replacement of an existing piston meter, the smaller size of the dual rotor turbine flow meter allows for reducing of the overall system size and more optimal placement of the flow meters 12 and 42.

The major adjustments necessary to replacement of a piston meter to a dual rotor turbine flow meter are to the electronics of the dispensing system. Typically, the electronics used in most dispensers today is adapted for use only with the electronic output of a piston meter. The electronics must be changed to accept the two pulse inputs from the dual rotor turbine flow meter, as well as the input from a temperature sensor.

The dual rotor turbine flow meter is a flow rate measuring meter. Thus, in order to obtain the quantity of fuel flowing therethrough, inferential calculations must be used. The superior performance of the dual rotor flow meter is achieved by summation of the Strouhal Number (temperature corrected K-factor) of both rotors at the operating Roshko Number (temperature corrected frequency/kinematic viscosity) of each rotor.

As described in U.S. Pat. No. 5,689,071, each rotor blade creates an electrical pulse as it passes a sensor. Since the two rotors are designed to operate at different speeds, the frequency generated by each rotor is also different. The different frequencies must be synchronized into a single rate computation over precise time intervals.

Figure 6:
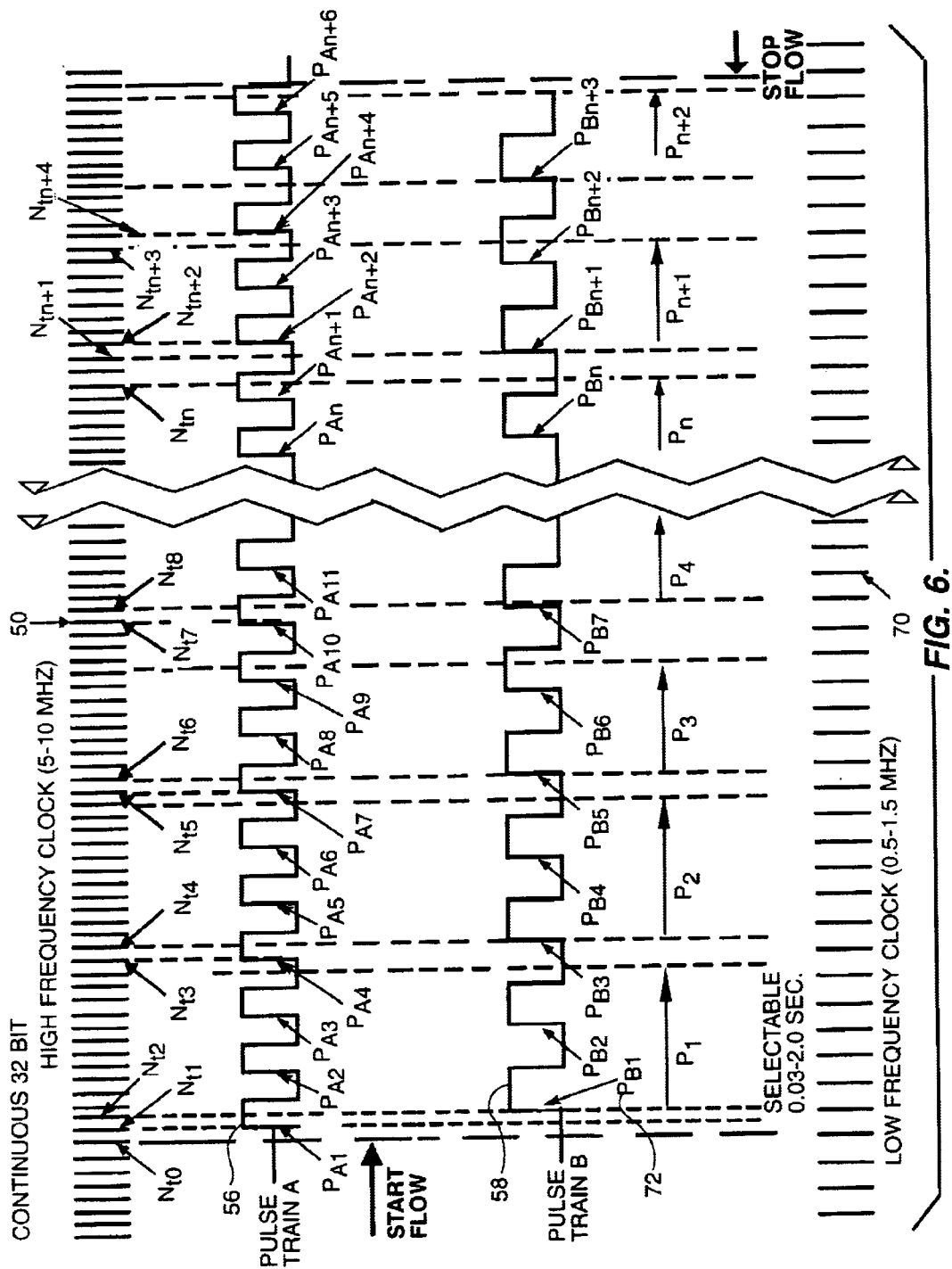
FIG. 6 is a timing diagram detailing the flow rate and totalization routines used in the present invention.

As best illustrated in FIG. 6, a 32 bit high frequency free running timer 50 is used as a clock. Typically, the clock rate is between 5–10 MHz. A pulse train A is generated by the upstream rotor A. A pulse train B is generated by the downstream rotor B. A counter 72 is used to count each of the pulse trains A, B. A second counter timer 70 is used to determine the sample period, preferably adjustable between 0.5 and 1.0 MHz, which can be slower than timer 50. In seconds, the timer period is preferably between 0.03 and 2 seconds.

When using a dual rotor turbine flow meter to quantify the amount of liquid flowing therethrough, it is best to keep the sample period to a minimum which is determined by the computational speed of the processors doing the calculations. The faster the processor, the lower the minimum sample period. In the example given below, the sample period is 0.03 seconds, or 30 milliseconds.

When the fuel begins to flow at time $t=Nt_0$, both rotors A, B begin to rotate as liquid passes therethrough. Both rotors A,B will be at speed as determined by the flow rate within 3 milliseconds, well within the 30 millisecond sample period. A first pulse 56 starts the timer which reads the clock as $t=Nt_1$. In this illustrated example, first pulse 56 is in pulse train A. It will be apparent to those skilled in the art that the initial pulse can also originate in pulse train B. At a first pulse 58 generated by the other rotor B, the clock is again read at $t=Nt_2$.

At the end of the timer period at the first pulse generated by either pulse train A or B, the clock is again read at $t=Nt_3$ and at the next pulse generated by the other rotor at $t=Nt_4$ where the timer is reset and another timer period begins. Note that a 32 bit clock running at 7.5 mHz will roll over every 572.5 seconds (i.e. all bits reset to 0) and thus, every time the clock is read a check must be made for such rollover. Likewise, the counters for each of the pulse trains are checked for rollover also though experience indicates that a 16 bit counter is sufficient for such uses.

As shown in FIG. 7, the frequency f for each pulse train A, B is now computed using the formula:

$f_A$=(Number of pulses in pulse train A during a first timer period-1)/$[(Nt_3-Nt_1)/f_{cc}]$ where $f_{cc}$ is the clock speed (i.e. 7.5 MHz in this example).

$f_B$=(Number of pulses in pulse train B during first timer period-1)/$[(Nt_4-Nt_2)/f_{cc}]$ Note that FIG. 6 illustrates the number of pulses being 3. In actual use, the number of pulses will vary between 6 to 50 depending on the flow rate. At the lowest normal operating flow rate, the meter frequency is about 7 Hz; thus the timer period will be about 143 milliseconds.

To compensate for temperature variations, the fuel temperature is sampled by a sensor 60, shown in FIG. 1, mounted on the meter. A temperature viscosity characteristic of the fuel, preprogrammed into the processor, is used to determine the kinematic viscosity $v_1$ of the fuel at the operating temperature during the first period. The Roshko Number for each rotor is then calculated as follows:

$$Ro_A=[f_A/v_1][1+3\alpha(T_1-T_R)]$$

$$Ro_B=[f_B/v_1][1+3\alpha(T_1-T_R)]$$

where $T_R$ is a reference temperature, typically 70° F. (20° C.) and $\alpha$=linear coefficient of expansion of the meter material.

The calibration between each meter will yield a relationship between the Roshko Number and the Strouhal Number for each rotor. Using this relationship, and the calculated Roshko Number, the Strouhal Number is computed for each rotor:

$$St_{A1}=F(Ro_A)$$

$$St_{B1}=F(Ro_B)$$

The average flow rate for the initial period is calculated as follows:

$$q_1=(f_{A1}+f_{B1})/[(St_{A1}+St_{B1})*(1+3\alpha(T_1-T_R))]$$

The quantity of fuel dispensed during the initial period is then computed as follows:

$$Q_1=q_1(Nt_4-Nt_1)$$

The calculations above are performed during each timer period as shown in FIG. 7. Thus, the total quantity of full dispensed is the summation of all quantities dispensed during all periods from the initial period to the final period:

$$Q_T=\Sigma Q_n \text{(from n=initial period to n=final period)}$$

The above calculations permit the dispensing of fuel on a mass basis which is often useful in aircraft applications. In this instance, in addition to programming in a temperature viscosity characteristic into the processor, a density temperature characteristic is programmed therein. Specifically, $$m_1=Q_1*\rho_1 \text{ where } \rho=\text{density of fuel in a given time period}$$
$$m_T=\Sigma m_n \text{ (n=1 to } n\text{)}$$

The calculations are similar thereafter.

It should be noted that errors do occur in the dual rotor turbine flow meter in that the initial quantity dispensed between $Nt_0$ and $Nt_1$ is generally not counted. However, this error is balanced by extra pulses counted during the stopping process at the end of the dispensing. Since both rotors A, B have momentum, it takes a finite amount of time for those rotors to actually come to a stop after the flow ceases. Thus, additional pulses are actually counted after flow ceases. These extra counts tend to cancel out the missing initial quantity.

For example, the start period of $Q_{nt1}-Q_{nt0}$ is missed so that $Q_T$ is understated by this amount. However, the period $N_{r1}-N_{r0}$ is less than one pulse of the first rotor A, thus, typically, the times involved are:

0.0003>$P_A$+$P_B$<0.1 sec whereby $Q_T$ is understated by less than 0.0005 Gal.

The above error is partially offset by the stop error whereby $Q_{nt+7}-Q_{nt+6}$ is overstated during the period $P_{n+3}$ since a portion of the pulse on each rotor A,B is missed. However, during the stopping period, rotors A, B coast for a few additional pulses. Thus, the frequency is actually calculated artificially high. As a result, if $Q_{nt+7}-Q_{nt+6}$ is overstated by 2 pulses of 0.03 seconds each which equals 6.6 Hz which is equivalent to a flow rate of 0.2 GPM. Thus, the stop error is addition about 0.00067 Gal. Combining the additive stop error and the subtractive start error yields a total error of 0.00017 Gal. The start/stop errors are usually quite small in comparison to the total volume of liquid dispensed.

In contrast, a piston meter provides stop/start errors which are additive in that the quantity missed at both ends runs to favoring an undercount of fuel dispensed. Thus, the dual rotor turbine flow meter tends to be more accurate than the piston meter.

Although only certain embodiments have been illustrated and described, it will be apparent to those skilled in the art that various changes and modifications may be made therein without departing from the spirit of the invention or from the scope of the appended claims.

What is claimed is:

1. A fuel dispensing system comprising:

a dual counter-rotating rotor turbine flow meter having a first rotor and a second rotor for determining the volume of fuel dispensed, the first rotor and the second rotor each having a plurality of rotor blades, the fuel dispensing system further comprising a point of sale display controller adapted to accept a first pulse input and a second pulse input from the dual rotor turbine flow meter and input from a temperature sensor, the first rotor and the second rotor operating at different speeds, the first rotor having a first sensor mounted proximate thereto, the second rotor having a second sensor mounted proximate thereto, the first sensor creating the first pulse input as one of the plurality of rotor blades of the first rotor passes the first sensor, the second sensor creating the second pulse input as one of the plurality of rotor blades of the second rotor passes the second sensor, a timer, a counter and a counter timer integrated into the point of sale display controller, the counter counting counts of the first pulse inputs and the second pulse inputs from the first sensor and the second sensor, the counter timer being used to determine a first sample period and a second timer period whereby said counts result in an integral number of first pulse inputs and the second pulse inputs, the counted first pulse input and the timer being used to determine the frequency $f_A$ of said first pulse input by the formula $f_A$=(Counted first pulse inputs during the first timer period-1)/[$(Nt_3-Nt_1)/f_{cc}$] where $f_{cc}$ is the clock speed, $Nt_1$ being the timer reading at the start of the first time period which initially is when a first pulse is received from either of the corresponding sensors and subsequently is $Nt_3$ from the preceding time period, $Nt_3$ being the timer reading at the end of the first timer period, the counted second pulse input and the timer being used to determine the frequency $f_B$ of said second pulse input by the formula $f_B$=(Counted second pulse inputs during first timer period-1)/[$(Nt_4-Nt_2)/f_{cc}$], $Nt_2$ being the timer reading at the start of the second timer period which initially is when a second pulse is received from the other of the two sensors and subsequently is $Nt_4$ from the preceding time period, $Nt_4$ being the timer reading at the end of the second timer period, the point of sale controller calculating the Roshko numbers for each rotor by the formulas, $Ro_A=[f_A/v_1][1+3\alpha(T_1-T_R)]$ and $Ro_B=[f_B/v_1][1+3\alpha(T_1-T_R)]$ where $T_R$ is a reference temperature and $T_1$ is a temperature reading from the temperature sensor, and $\alpha$=linear coefficient of expansion of the fuel and meter material and $v_1$ is the kinematic viscosity of the fuel at the temperature reading, the point of sale controller calculating the Strouhal numbers $St_{A1}$ and $St_{B1}$ from the following formulae, $St_{A1}=f(Ro_A)$ and $St_{B1}=f(Ro_A)$, and average flow rate $q_1$ for a timer period being $q_1=(f_{A1}+f_{B1})/[(St_{A1}+St_{B1})*(1+3\alpha(T_1-T_R)]$ and the quantity of fuel $Q_1$ dispensed during the timer period being $Q_1=q_1 (Nt_4-Nt_1)$ and the total fuel $Q_T$ dispensed being calculated by summing $Q_1$ over all periods.

2. The fuel dispensing system of claim 1 wherein the timer is a 32 bit clock running between 5 and 10 megahertz.

3. The fuel dispensing system of claim 2 wherein the 32 bit clock runs at 7.5 megahertz.

4. The fuel dispensing system of claim 1 wherein the counter timer runs between 0.5 and 1.0 megahertz.

5. The fuel dispensing system of claim 1 wherein the first timer period and the second timer period are between 0.03 and 2 seconds.

6. A fuel dispensing system comprising:

a dual counter-rotating rotor turbine flow meter having a first rotor and a second rotor for determining the volume of fuel dispensed through the dual rotor turbine flow meter, the first rotor and the second rotor each having a plurality of rotor blades, the first rotor and the second rotor operating at different speeds, the first rotor having a first sensor mounted proximate thereto, the second rotor having a second sensor mounted proximate thereto, the first sensor creating the first pulse input as one of the plurality of rotor blades of the first rotor passes the first sensor, the second sensor creating tho second pulse input as one of the plurality of rotor blades of the second rotor passes the second sensor, a point of sale display controller adapted to accept the first pulse input and the second pulse input from each of the corresponding sensors and input from a temperature sensor, a timer, a counter and a counter timer integrated into the point of sale display controller, the counter counting counts of the first pulse inputs and the second pulse inputs from the first sensor and the second sensor, the counter timer being used to determine a first sample period and a second timer period, the counted first pulse input and the timer being used to determine the frequency $f_A$ of said first pulse input by the formula $f_A$=(Counted first pulse inputs during the first timer period–1)/$[(Nt_3-Nt_1)/f_{cc}$ where $f_{cc}$ is the clock speed, $Nt_1$ being the timer reading at the start of the first time period which initially is when a first pulse is received from either of the corresponding sensors and subsequently is $Nt_3$ from the preceding time period, $Nt_3$ being the timer reading at the end of the first timer period, the counted second pulse input and the timer being used to determine the frequency $f_B$ of said second pulse input by the formula $f_B$=(Counted second pulse inputs during first timer period–1)/$[(Nt_4-Nt_2)/f_{cc}]$, $Nt_2$ being the timer reading at the start of the second timer period which initially is when a second pulse is received from the other of the two sensors and subsequently is $Nt_4$ from the preceding time period, $Nt_4$ being the timer reading at the end of the second timer period, the point of sale controller using the two frequencies to calculate the total fuel volume being dispensed therefrom.

7. A method for dispensing fuel using a dual counter-rotating rotor turbine flow meter having a first rotor and a second rotor for determining the volume of fuel dispensed, the first rotor and the second rotor each having a plurality of rotor blades, the method comprising the steps of:

operating the first rotor and the second rotor at differing speeds, generating a first pulse input as one of the plurality of rotor blades of the first rotor passes a first sensor mounted proximate to the first rotor, generating a second pulse input as one of the plurality of rotor blades of the second rotor passes a second sensor mounted proximate to the second rotor, counting the first pulse inputs and the second pulse inputs, determining a first time period providing as integral number of first pulse inputs, determining a second time period providing an integral number of second pulse inputs, calculating the frequency $f_A$ of said first pulse input the formula $f_A$=(Counted first pulse inputs during the first sample period–1)/$[(Nt_3-Nt_1)/f_{cc}]$ where $f_{cc}$ is a clock speed, $Nt_1$ being the time at the start of the first time period defined initially when a first pulse is received from either of the corresponding sensors and subsequently is $Nt_3$ from the preceding time period, $Nt_3$ being the timer reading at the end of the first timer period, the counted second pulse input calculating the frequency $f_B$ of said second pulse input by the formula $f_B$=(Counted second pulse inputs during first timer period–1)/$[(Nt_4-Nt_2)/f_{cc}]$, $Nt_2$ being the timer reading at the start of the second timer period which initially is when a second pulse is received from the other of the two sensors and subsequently is $Nt_4$ from the preceding time period, $Nt_4$ being the timer reading at the end of the second timer period, calculating the Roshko numbers for each rotor by the formulas, $Ro_A=[f_A/v_1][1+3\alpha(T_1-T_B)$ and $Ro_B=[f_B/v_1][1+3\alpha(T_1-T_R)$ where $T_R$ is a reference temperature and $T_1$ is a temperature reading from the temperature sensor, and $\alpha$=linear coefficient of expansion of the fuel and meter material and $v_1$ is the kinematic viscosity of the fuel at the temperature reading, the point of sale controller calculating the Strouhal numbers $St_{A1}$ and $St_{B1}$ from the following formulae, $St_{A1}=f(Ro_A)$ and $St_{B1}=f(Ro_B)$, and average flow rate $q_1$ for a timer period being $q_1=(f_{A1}+f_{B1})/[(St_{A1}+St_{B1})*(1+3\alpha(t_1+T_R))$ and the quantity of fuel $Q_1$ dispensed during the timer period being $Q_1=q_1 (Nt_4-Nt_1)$ and the total fuel $Q_T$ dispensed being calculated by summing $Q_1$ over all periods.

* * * * *